Sept. 18, 1956   LE ROY A. GRIFFITH ET AL   2,763,283
REFUELING CONTROL APPARATUS
Filed May 11, 1951
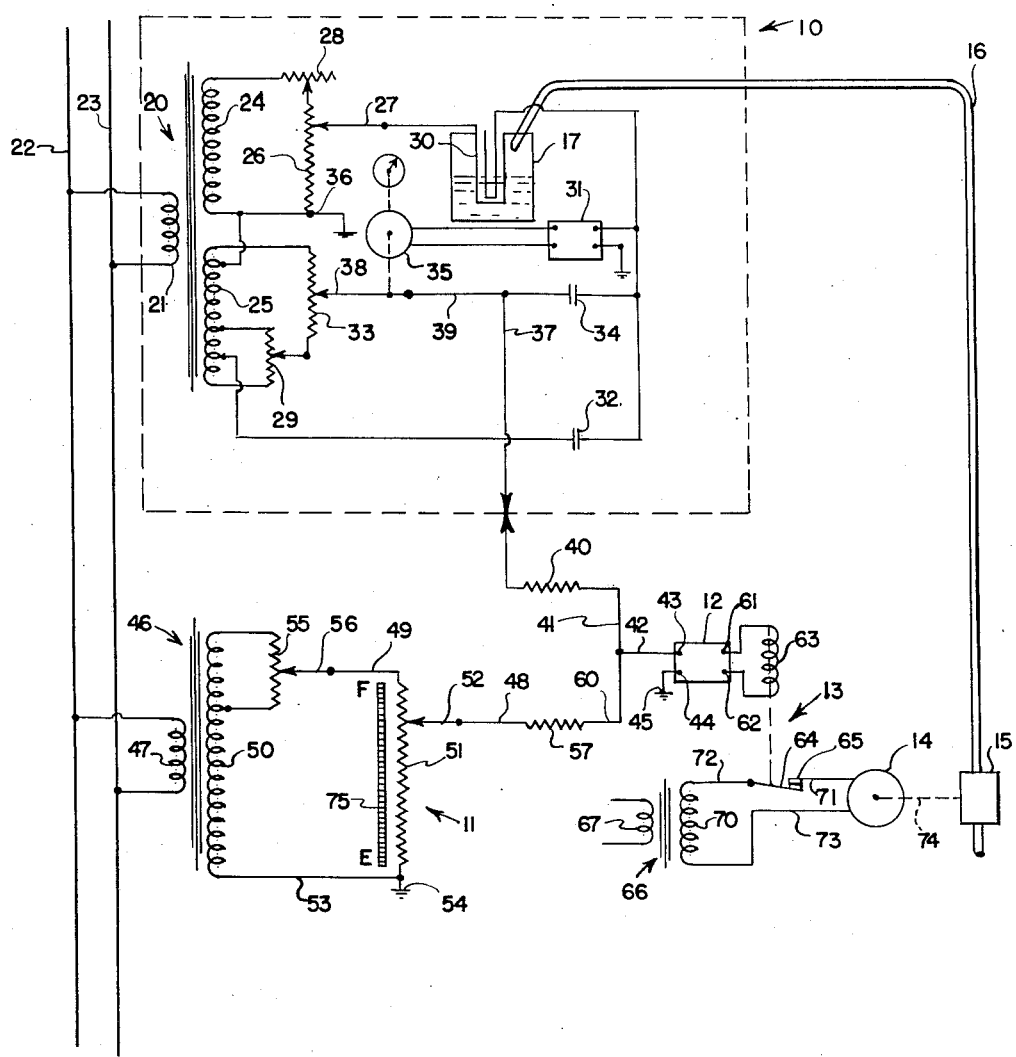
*INVENTOR.*
LEROY A. GRIFFITH
BY  RICHARD M. FRANZEL
George H Fisher
*ATTORNEY*

United States Patent Office 2,763,283
Patented Sept. 18, 1956

2,763,283

REFUELING CONTROL APPARATUS

Le Roy A. Griffith, Minneapolis, and Richard M. Franzel, Edina, Minn., assignors to Minneapolis-Honeywell Regulator Company, Minneapolis, Minn., a corporation of Delaware Application May 11, 1951, Serial No. 225,766

3 Claims. (Cl. 137—392)

This invention is concerned generally with control of fuel quantity in fuel tanks, primarily for use with aircraft, and more particularly with a refueling control for automatically stopping the refueling of a tank upon the quantity of fuel in the tank reaching a predetermined amount. It is therefore an object of this invention to provide a new and improved refueling control apparatus.

Another object of the invention is to design a refueling control apparatus which is simple in design and may be compact in size.

A further object of the invention is to design a refueling control apparatus which is electronic in operation and has a minimum of moving components.

A further object of the invention is to design a refueling control apparatus which makes use of existing standard equipment and thus needs a minimum amount of additional equipment.

A further object of the invention is to design a refueling control apparatus which is sufficiently flexible to enable an operator to manually set the control apparatus to vary the amount of fuel which it is desired to have in the tank.

Briefly, the invention involves the use of an improved type of fuel indication apparatus which may already be present to indicate the quantity of fuel in the tank. A voltage indicative of the actual quantity of fuel in the tank is taken from this apparatus and compared with a constant voltage from a potentiometer which has been preset to provide a voltage indicative of the quantity of fuel it is desired to have in the tank. The resultant voltage is impressed on the input circuit of an amplifier to operate a relay which controls the on-off operation of a motor which drives the refueling pump. When the voltages compared are equal, the actual quantity of fuel is then the desired quantity and the motor is stopped and halts operation of the pump.

For a more thorough discussion of the invention reference is had to the following detailed description taken in conjunction with the accompanying drawing, in which the single figure is a schematic diagram of the invention. As shown in the drawing an indicating apparatus 10 provides a first voltage which is compared with a second voltage from a potentiometer network 11 in an amplifier 12 to operate a relay 13. The relay 13 operates upon an energizing circuit of a motor 14 which controls the operation of a pump 15. The pump 15 forces fuel through a pipe 16 to a container 17, the quantity of which is measured by the indicating apparatus 10.

The indicating apparatus 10 is shown and claimed in an application of John W. Bancroft having a Serial No. 181,747, filed August 28, 1950 and assigned to the same assignee as the present invention. Briefly, the indicating apparatus is energized by a transformer 20 having a primary 21 energized from a source of voltage, not shown, through a pair of conductors 22 and 23. The transformer 20 also has a pair of secondaries 24 and 25. A potentiometer 26 is connected across secondary 24 through an empty calibrating rheostat 28. The potentiometer 26 has a wiper arm 27 which is connected to one plate of a tank unit 30. The second plate of the tank unit is connected to an input terminal of an amplifier 31.

A capacitor 32 is connected between a terminal on secondary 25 and the same input terminal of amplifier 31 to which the tank unit 30 is connected. The signal due to the voltage across capacitor 32 and the capacitance of the capacitor 32 is equal to and cancels out the signal due to the voltage across the tank unit 30 and the capacitance of the tank unit 30 when there is no fuel in the tank.

A follow up potentiometer 33 is connected across a portion of the transformer secondary 25 through a full calibration potentiometer 29. The wiper arm 38 of this potentiometer is connected to a capacitor 34, the other plate of which is connected to the same input terminal of amplifier 31 to which the tank unit 30 and capacitor 32 are connected. The amplifier 31 operates a motor 35 to move the wiper arm 38 along potentiometer 33 to reduce the input signal to amplifier 31 to zero. As can be seen in the drawing, the lower terminal of potentiometer 26 is connected to a point 36 of ground potential, as is a point near the upper end of transformer secondary 25.

The empty calibration is made with tank 17 empty by moving wiper arm 38 along potentiometer 33 until it is at ground potential and then adjusting the wiper arm along rheostat 28 until the network 10 is almost balanced. Final balancing is accomplished by moving wiper arm 27 along potentiometer 26. For full calibration tank 17 is filled and wiper arm 38 is moved along potentiometer 33 to the lower end and the wiper arm on potentiometer 29 is then adjusted until the network 10 is balanced. Balance at the "Empty" end of the scale is achieved when the capacitance of tank unit 30 times the voltage across it is equal to the capacitance of capacitor 32 times the voltage across it. Balance at the "Full" end of the scale is achieved when the capacitance of tank unit 30 due to the fuel in the tank times the voltage across the tank unit is equal to the capacitance of fixed capacitor 34 times the voltage across the capacitor. Thus, when the network is balanced it is seen that, because the signal due to capacitor 32 balances out the empty tank signal from tank unit 30, the voltage on the wiper arm on potentiometer 33 is an indication of the signal from the tank unit due solely to fuel in the tank 17.

This signal giving an indication of the actual quantity of fuel in tank 17 is then tapped off through conductor 37. This signal is sent through a summing resistor 40 and conductors 41 and 42 to input terminal 43 of amplifier 12. The second input terminal 44 of amplifier 12 is connected to ground terminal 45.

A transformer 46 having a primary 47 connected to a power source through conductors 22 and 23 provides a voltage for the potentiometer 11 to obtain a voltage indicative of the desired quantity of fuel in tank 17. Transformer 46 has a secondary 50. The potentiometer 11 has a resistance element 51 and wiper arm 52 moving thereacross. The bottom end of the resistance element 51 is connected to the bottom terminal of transformer secondary 50 through conductor 53. This conductor is grounded at ground terminal 54. A potentiometer 55 is connected across the upper portion of transformer secondary 50. The wiper arm 56 of potentiometer 55 is connected to the upper terminal of resistance element 51 of potentiometer 11. It can thus be seen that when the wiper arm 52 is at the bottom end of the resistance element 51 of the potentiometer 11 there is zero voltage on wiper arm 52 which is indicative of an empty tank of fuel. When the wiper arm 52 is at the upper end of the resistance element 51 of the potentiometer 11 a maximum voltage is obtained which is indicative of a full tank of fuel. The purpose of potentiometer 55 is to control the amount of voltage across the resistance element 51 of potentiometer 11 so as to make allowance for different types of fuel which might cause different indications for the same quantity of fuel.

The signal on wiper arm 52 is passed through summing resistor 57 and conductors 60 and 42 to the input terminal 43 of amplifier 12. The transformer secondary 25 is connected to ground near its upper end while transformer secondary 50 is connected to ground at its lower end. Therefore, the voltages picked off by wiper arms 38 and 52 are opposed in polarity and subtract from each other in the input circuit of amplifier 12. When the magnitude of the voltage on conductor 48 is greater than the magnitude of the voltage on conductor 37 amplifier 12 is so energized as to place a potential across the output circuit of the amplifier. The amplifier is, of course, connected to any convenient source of power, not shown, which is of such polarity with respect to the polarity of the voltage on conductor 48 as to cause energization of the amplifier upon a voltage of the polarity of the voltage on conductor 48 being impressed on the input circuit of the amplifier.

Amplifier 12 has a pair of output terminals 61 and 62 to which relay coil 63 of relay 13 is connected for energization. Amplifier 12 may be any type of amplifier which can take a signal of one phase only and amplify it to produce an output great enough to cause energization of a relay coil. Upon a zero signal or signal of the opposite phase the amplifier does not energize the relay coil. Any well known type of amplifier using an A. C. reference voltage may be employed. A typical amplifier of this type is shown in the Markusen application 783,265, filed October 31, 1947, now Patent No. 2,626,324, and assigned to the same assignee as the present invention. Because merely on-off operation of the relay 13 is desired a thyratron may be used in the output stage of amplifier 12.

Relay 13 has a movable contact 64 which makes and breaks connection with a fixed contact 65. These contacts are placed in the energizing circuit of motor 14 which is connected to a transformer 66 having a primary 67, connected to a source of voltage not shown, and a secondary 70. The motor 14 is connected to the transformer secondary 70 by conductor 71, fixed contact 65, movable contact 64, conductor 72, transformer secondary 70 and conductor 73 back to the motor 14. Motor 14 need merely be a type of constant speed motor capable of operating in only one direction.

Motor 14 operates upon valve 15 through a mechanical connection 74 such that operation of the motor causes the pump 15 to drive fuel through the pipe 16 to fill the tank 17.

The operation of this apparatus is as follows:

An operator sets the wiper arm 52 of potentiometer 11 along resistance element 51 so as to produce a voltage of constant magnitude indicative of the desired quantity of fuel in the tank 17. A dial 75 calibrated in gallons or in percentage of a full tank of fuel may be used to assist the operator. This voltage is compared with the voltage from indicating apparatus 10 which produces a signal indicative of the actual quantity of fuel in the tank 17. These two voltages oppose each other and are compared in the input circuit of amplifier 12 to cause energization of relay winding 63, it being assumed, of course, that the quantity of fuel in the container 17 is less than that quantity desired. Energization of relay winding 63 causes contact between contacts 64 and 65 to energize the motor and cause operation of the pump to pump fuel to the tank. As the tank gradually fills up the alternating voltage signal from the indicating apparatus gradually increases and approaches the constant magnitude of the alternating voltage signal from wiper arm 52 of the refueling control potentiometer. The phasing of the two voltages being compared being in opposition the signal on the input of amplifier 12 is gradually decreased until it becomes zero. At this time the amplifier is deenergized and deenergizes relay winding 63. This causes contacts 64 and 65 to break contact and deenergize motor 14. Deenergization of motor 14 halts operation of pump 15 to stop the flow of fuel to tank 17.

It is thus seen that a simple, accurate and compact refueling control apparatus has been designed which uses a minimum of additional equipment.

It is realized that modifications within the spirit of this invention can be made by those skilled in the art and it is therefore to be understood that the scope of this invention is to be limited only to the extent of the appended claims.

We claim:

1. Apparatus for controlling the filling of a container with liquid comprising, in combination: a first source of voltage of a first sense, impedance type liquid quantity sensing means, voltage responsive means, means connecting said sensing means to said first source of voltage and to said voltage responsive means to apply to said voltage responsive means a quantity voltage of a first sense and of a magnitude indicative of the quantity of liquid in the container; a second source of variable voltage of a sense opposite to said first sense, impedance means, means connecting said impedance means to said second source of voltage and to said voltage responsive means to apply to said voltage responsive means a rebalance voltage of a sense opposite to said first sense, means controlled by said voltage responsive means in accordance with the voltage applied to said voltage responsive means, means connecting said last named means to said second source of voltage to vary the voltage applied to said impedance means and cause said rebalance voltage to be equal in magnitude to said quantity voltage; a third source of variable voltage of said first sense, means associated with said third source of voltage arranged to vary the output of said third source of voltage and cause the magnitude thereof to be indicative of the desired quantity of liquid in the container; means algebraically adding the voltage derived from said second source of voltage and the voltage derived from said third source of voltage to thereby derive a resultant voltage; container filling apparatus, and further voltage responsive means connected to said last named means and to said container filling apparatus to cause operation of said container filling apparatus upon said resultant voltage being of said first sense and to halt operation of said container filling apparatus upon said resultant voltage being of said opposite sense.

2. Apparatus for controlling the filling of a container with liquid comprising, in combination: a first source of alternating voltage of a first phase, capacitance type liquid quantity sensing means, voltage responsive means, means connecting said sensing means in series to said voltage responsive means and said first source of alternating voltage to apply to said voltage responsive means a quantity voltage of a first phase whose magnitude is indicative of the quantity of liquid in the container; a second source of variable alternating voltage of an opposite phase, a capacitor, means connecting said capacitor in series to said voltage responsive means and said second source of alternating voltage to apply to said voltage responsive means a rebalance voltage of said opposite phase; means controlled by said voltage responsive means in accordance with the voltage applied to said voltage responsive means, means connecting said last named means to said second source of alternating voltage to vary the voltage thereof and thereby cause said rebalance voltage to be equal in magnitude to said quantity voltage; a third source of alternating voltage, a potentiometer having a resistance element and a movable wiper, means connecting said potentiometer resistance element across said third source of voltage in a manner to apply a voltage of said first phase to said potentiometer wiper, means for adjusting said potentiometer wiper to cause the voltage thereon to be of a magnitude indicative of the desired quantity of liquid in the container; further voltage responsive means, means connecting said further voltage responsive means to said second source of alternating voltage and to said potentiometer wiper to thereby compare the voltage of said opposite phase derived from said second source of alternating voltage with the voltage of said first phase derived from said potentiometer wiper; container filling apparatus, and means connecting said container filling apparatus to be controlled by said further voltage responsive means to render said container filling apparatus operative upon the voltage of said first phase derived from said potentiometer wiper being of a greater magnitude than the voltage of said opposite phase derived from said second source of alternating voltage.

3. Apparatus for controlling the filling of a container with liquid comprising, in combination: a first source of alternating voltage having an intermediate potential point connected to ground potential, capacitance type liquid quantity sensing means, means connecting said liquid quantity sensing means to said first source of alternating voltage at a potential point which is of a first phase with respect to ground potential, a first potentiometer having a resistance element with a movable tap, means connecting said first potentiometer resistance element across a portion of said first source of alternating voltage which is of a phase opposite to said first phase, a capacitor, means connecting said capacitor to said potentiometer tap, a first amplifier having a pair of input terminals, means connecting one of the input terminals of said first amplifier to ground potential, means connecting the other of the input terminals of said first amplifier to said liquid quantity sensing means and to said capacitor, means controlled by the output of said first amplifier to control the position of said first potentiometer tap; a second source of alternating voltage, a second potentiometer having a movable tap and a resistance element, means connecting said second potentiometer resistance element across said second source of alternating voltage to cause a potential of said opposite phase to appear at one end of said second potentiometer resistance element, means connecting said one end of said second potentiometer resistance element to ground potential, said second potentiometer tap being manually movable to derive a voltage thereon of said first phase and of a magnitude indicative of the desired quantity of liquid in the container, a second amplifier having a pair of input terminals, means connecting one input terminal of said second amplifier to ground potential, means connecting the other input terminal of said second amplifier to said second potentiometer wiper, means detachably connecting said other input terminal of said second amplifier to said first potentiometer wiper, said second amplifier comparing the voltage of said first phase derived from said second potentiometer wiper with the voltage of said opposite phase derived from said first potentiometer wiper; container filling apparatus, and means connecting said filling apparatus to be controlled by said second amplifier in accordance with the voltage applied to the input terminals thereof to cause operation of said container filling apparatus upon the voltage at the input terminals of said second amplifier being of said first phase and to halt operation of said container filling apparatus upon the voltage being of said opposite phase.

References Cited in the file of this patent

UNITED STATES PATENTS

| | | |
|---|---|---|
| 654,631 | Hays | July 31, 1900 |
| 2,307,077 | Reagan | Jan. 5, 1943 |
| 2,336,492 | MacKay | Dec. 14, 1943 |
| 2,424,657 | Goodman | July 29, 1947 |
| 2,446,534 | Fausek et al. | Aug. 10, 1948 |
| 2,462,076 | Dryden | Feb. 22, 1949 |
| 2,502,578 | McDaniel | Apr. 4, 1950 |
| 2,525,967 | Smoot | Oct. 17, 1950 |
| 2,530,619 | Kliever | Nov. 21, 1950 |
| 2,608,678 | Marchment | Aug. 26, 1952 |

OTHER REFERENCES

"Electronics," volume 23, issue 4, pages 77–79, April, 1950, 318–28.